Figure 1:
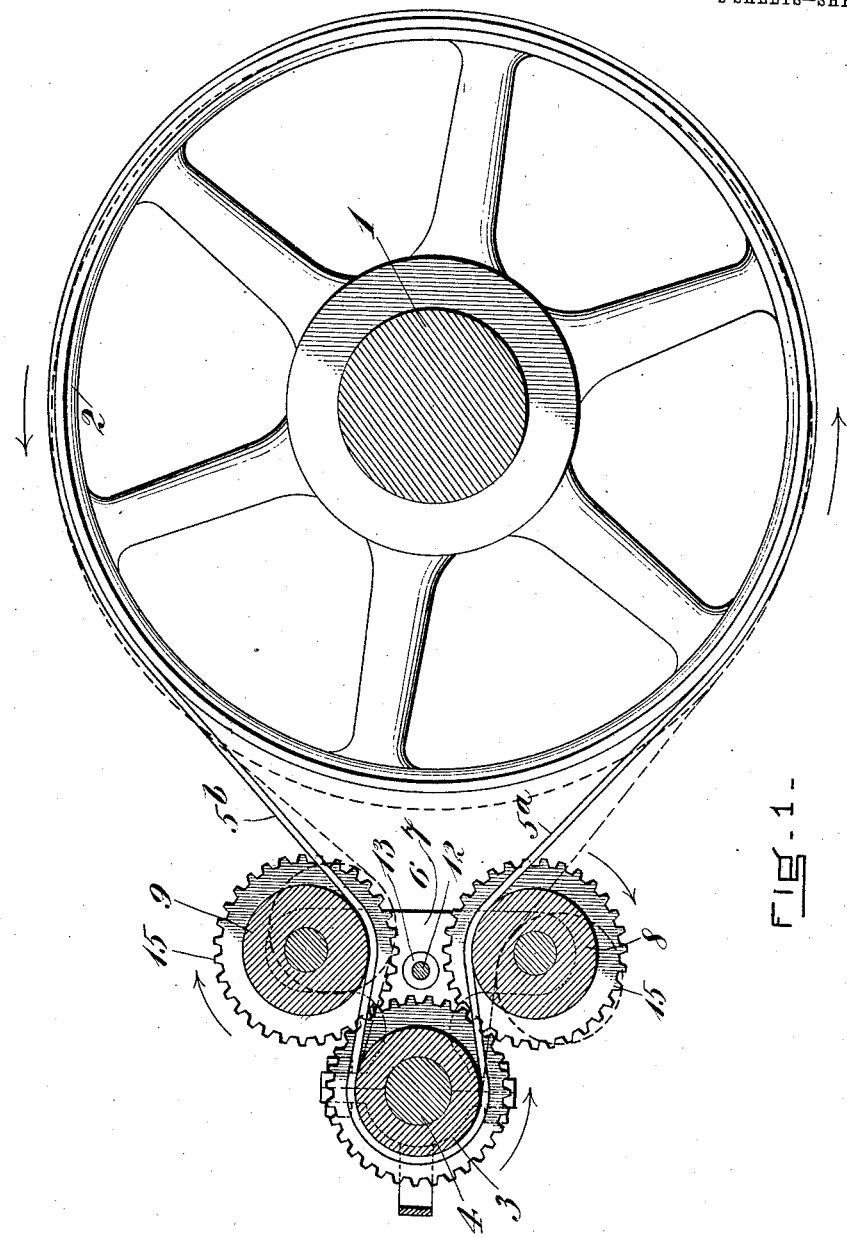

J. H. SEWALL.
BELT TIGHTENER.
APPLICATION FILED DEC. 31, 1908.

1,016,787.

Patented Feb. 6, 1912.

2 SHEETS—SHEET 1.

WITNESSES:
M. E. Flaherty
W. P. O'Brien

INVENTOR:
James H. Sewall
by his atty
Clarker Raymond Lowe

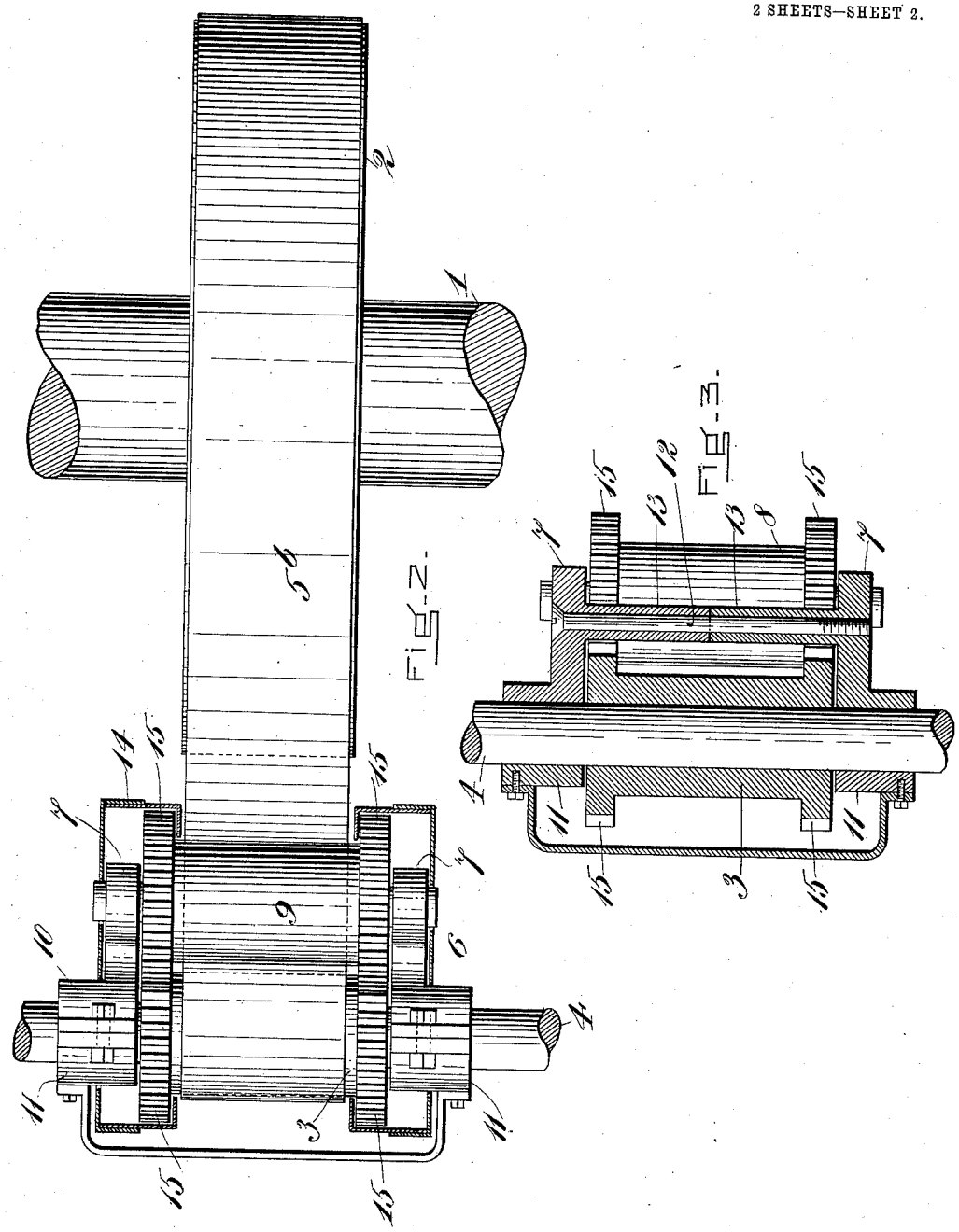

UNITED STATES PATENT OFFICE.

JAMES H. SEWALL, OF KEENE, NEW HAMPSHIRE, ASSIGNOR OF ONE-HALF TO DANIEL D. SEWALL, OF AUGUSTA, MAINE.

BELT-TIGHTENER.

1,016,787. Specification of Letters Patent. Patented Feb. 6, 1912.

Application filed December 31, 1908. Serial No. 470,216.

*To all whom it may concern:*

Be it known that I, JAMES H. SEWALL, of Keene, in the county of Cheshire and State of New Hampshire, a citizen of the United States, have invented a new and useful Improvement in Belt-Tighteners, of which the following is a full, clear, and exact description, reference being had to the accompanying drawings, forming a part of this specification, in explaining its nature.

My invention relates essentially to a means or device for regulating, taking up or compensating for any slack or variation in the tension of a belt connecting pulleys or similar parts.

The especial object of my invention is to provide such means or device as will be automatic in its operation and be operated by power inherent in the belt itself during the operation thereof without the use of springs or other auxiliary power or force inducing parts; and which device also will operate irrespective of the direction in which the belt is moving.

My invention relates also to a means whereby the device aforementioned may be made to increase the bearing surface of the belt upon any pulley in connection with which the device is used and be made also to provide a frictional bearing surface or surfaces supplementing the frictional bearing of the belt on the pulley, thereby diminishing the chance of the belt slipping on the pulley without retarding the operation of the belt.

A further object of my invention is to provide a means or device of the aforesaid character applicable for use in connection with pulleys and connecting belt or like parts used for the purpose of transmitting power from the axle or running gear of a car to a dynamo generating an electric current for lighting the car. A belt used under these circumstances is susceptible to considerable variation or tension owing to the movement of the axle and pulley thereon, from which the power is taken, relatively to the driven pulley on the axle of the armature of the dynamo. Such relative movement is occasioned not only by reason of the fact that the dynamo is affixed to the truck yieldingly supported with respect to the axle of the car but also and more essentially for the reason that when the brakes are applied to the car wheels the position of their axle is considerably changed.

My invention can best be seen and understood by reference to the drawings in which—

Figure 1 shows the device mainly in vertical cross section. Fig. 2 shows the device in side elevation, and Fig. 3 is a longitudinal vertical section of the device.

In the drawings:—1 represents a shaft which may be the axle connecting with the two wheels (not shown) of a car. Affixed to this shaft is a pulley 2 which for purposes of illustration may be termed the driving pulley.

3 represents a pulley affixed to a shaft 4 which may be the shaft for turning the armature of a dynamo (not shown). The pulley 3 for purposes of illustration may be termed the driven pulley. Connecting the pulleys 2 and 3 is a belt 5. Pivotally mounted upon the shaft 4 is a swinging frame 6 having connected sides 7 spaced apart and in which are journaled to turn idler pulleys 8 and 9 auxiliary to the pulley 3 and coöperating with this pulley in the regulation and adjustment of the belt as will hereinafter be explained. The sides 7 pivotally connect with the shaft 4 at points just adjacent to the respective ends of the pulley 3 so that the auxiliary pulleys borne by the frame will be maintained in proper position to coöperate with the belt. The two sides of the frame are each pivotally secured to the shaft 4 by means of a projecting shoulder 10 forming one portion of a box around the shaft 4, the other section of the box being formed by a cap 11 bolted to the box section 10. The two sides of the frame are further united by means of a cross bolt 12 and attaching nut. The two sides 7 are held properly spaced apart for the pulleys 8 and 9 to turn freely in and between them by means of hubs 13 projecting laterally from the interiors of the respective sides 7 and meeting in abutting ends, the length of the hubs being such as will define a proper spacing or separation of the two sides. In the construction shown, which is a preferred construction, the bolt 12 passes through these two hubs which embrace the bolt in the manner of sleeves. As the nut on the end of the bolt is tightened the abutting ends of the hubs will be brought tightly together which not only acts to define the proper separated position of the two sides but also to brace and strengthen the entire structure of the frame.

As said before, the construction I have indicated is only a preferred construction which may well be varied. It presents, however, the advantages of providing a proper mounting for the auxiliary pulleys and one which permits of these pulleys being simultaneously shifted or moved with respect to the belt 5 upon the application of a force or pressure tending to move them. In other words, the pulleys 8 and 9 may simultaneously be shifted or moved in a direction transverse to the line of centers of the pulleys 2 and 3 on an arc around the pulley 3, the frame 6 causing the pulleys 8 and 9 to be moved in unison about the axis of the shaft 4.

Before referring to the particular disposition and adaptation of the auxiliary pulleys, attention is directed to the casing 14 secured to the frame and which may be so made and affixed as to cover not only the pulleys carried by the frame but also the pulley 3 with which the auxiliary pulleys coöperate.

In respect to the disposition and arrangement of the auxiliary pulleys in the frame 6, it may be said that the axis of these pulleys are each preferably the same distance from the axis of the pulley 3. The auxiliary pulleys are also so located that each will present a bearing surface acting to angularly flex or bend in different directions the oppositely moving portions $5^a$, $5^b$ of the belt running between the pulleys 2 and 3. I prefer also that the pulleys 8 and 9 shall lie outside the belt. Accordingly to obtain the effect above noted it is necessary that the arrangement of the pulleys be such that the distance between the surfaces thereof bearing against the belt should be less than the diameter of the pulley 3. With the auxiliary pulleys thus arranged and disposed in respect to the belt and the pulleys 2 and 3, the belt as it turns, assuming that it is running in the direction indicated by the arrow, will pass off of the pulley 3, thence inwardly around the auxiliary pulley 8, thence outwardly around the pulley 2, thence inwardly around the auxiliary pulley 9 and outwardly around the pulley 3 to the point of beginning. Now with the belt moving in the direction indicated by the arrow, it is a fact that the portion $5^a$ of the belt during its operation will be maintained under a greater tension than its oppositely moving portion $5^b$, this difference of tension being occasioned by the pull of the driving pulley on the belt and the amount of difference in tension will vary depending upon the load on the driven pulley 3. In consequence of there being an increased tension between the portions $5^a$ and $5^b$ of the belt the tendency will be for the portion $5^a$ of the belt to bear harder against the auxiliary pulley 8 than the bearing of the portion $5^b$ of the belt against the pulley 9. Accordingly the portion $5^a$ of the belt bearing against the pulley 8 will act to move both pulleys 8 and 9 from their normal positions, the pulleys yielding to the influence of the belt and the angles of flexure or bending of said respective portions of the belt produced by the respective pulleys will become changed, the angle in the portion $5^a$ of the belt becoming more obtuse as the angle in its portion $5^b$ becomes more acute. The effect is that although both auxiliary pulleys are moved an equal amount yet the pulley 9 in its changed position will act to take up more of the belt than is let out by the pulley 8. The immediate effect of this is that any undue tension in the portion $5^a$ of the belt will be relieved and the slack occasioned by such relief immediately taken up or compensated for in the portion $5^b$, thereby distributing the strain evenly throughout the entire belt.

In the event of slack in the belt caused by the changed position of the pulley 2 or the pulley 3 or even that of both pulleys (for purposes of illustration I have shown only a changed position of the pulley 2), the immediate effect is that the slack in the belt will be taken up. In such case the slack will not occur in the portion $5^a$ of the belt which is being drawn off the pulley 3 onto the pulley 2 by reason of the drawing strain exerted by the driving pulley, but the slack will occur in the portion $5^b$ of the belt which is rendering off the pulley 2 and drawing onto the pulley 3. Accordingly the tension in the portion $5^a$ of the belt will be maintained with the effect that this portion of the belt drawing against the pulley 8 will tend to move this pulley inasmuch as there is nothing to retard such movement and the movement of the pulley 8 together with the pulley 9, which is a simultaneous movement, will continue until the pulley 9 draws against the portion $5^b$ of the belt, taking up the slack therein. It is true that as the pulley 8 is moved the belt is let out, and though the pulley 9 is moved only an equal amount, yet this pulley will act to take up more of the belt in the portion $5^b$ than is let out in the portion $5^a$, thereby taking up the slack formed in the belt occasioned as aforesaid. When the slack in the belt thus taken up is eliminated as by the restoration of the pulley 2 to its original position, the auxiliary pulleys will simply be drawn back by the swinging of the frame to their original positions where they act to regulate the normal running of the belt in the manner above explained.

The device will work equally as well whether the belt is moving in the direction indicated or in a reverse direction. In case the belt moves in a direction reverse to that above noted the only difference in the action from that above described is that the pulley 8 will act to take up the slack in the belt instead of the pulley 9. It is evident also that the operation of the device is independent of the disposition of the device in respect to the driving or driven pulley. Usually the device is located to coöperate with the smaller pulley which in most cases is the driven pulley.

Under some circumstances instead of the belt being slackened by a changed position of the pulleys around which it is rendering, either one or both of these pulleys may be moved out extending the belt as it were. Such movement can be compensated for by making the belt so long that when the pulleys are extended outwardly from their normal positions the belt will be of sufficient length to permit of such movement. Accordingly when the pulleys are in their normal positions by reason of the relative slack in the belt so occasioned the auxiliary pulleys will be turned to a position where this slack will be compensated for or taken up by the formation of unequal angles of flexure in the respective portions of the belt. Then as the pulleys around which the belt is rendering are drawn out or extended the position of the slack adjusting device will be changed to vary the angles of flexure still further by an amount commensurate with the changed position of the belt.

In respect to that adaptation of my device whereby it may act to relatively increase the friction surface of the pulley (with which the device is coöperating), normally bearing against or presented to the belt rendering over the same, and to supplement this friction surface by providing in itself auxiliary friction surfaces engaging the belt thereby lessening the chance of the belt slipping on the pulley, attention is first directed to the fact that the auxiliary pulleys 8 and 9, located as they are on the outside of the belt and flexing or bending the belt as they do, act to draw the belt around the pulley 3 with which the auxiliary pulleys are coöperating and so increase the friction bearing of the belt on this pulley over that it would normally have on the pulley. The auxiliary pulleys may also be made (as they preferably are made in order to best obtain the present effect), of the same size as the driven pulley 3 with which they are coöperating. They may also be geared to the driven pulley, all of the pulleys being connected by gears 15 arranged upon the ends of the set of pulleys 3, 8 and 9, these gears taking the place of the usual flange on the ends of the pulleys which act to guide and retain the belt. The effect of this is that the pulleys will all rotate simultaneously in the direction the belt is moving as indicated by the arrows. Now the belt bears for a considerable distance upon both auxiliary pulleys 8 and 9 and inasmuch as these pulleys can rotate only in unison with the pulley 3 with which they are coöperating, the surface of the pulleys 8 and 9 against which the belt frictionally bears accordingly supplements the surface of the pulley 3 against which the belt is frictionally bearing thereby lessening the chance of the belt slipping on the pulley 3. Respecting this last phase of my invention and in further reference to the size of the pulleys 8 and 9 with respect to the pulley 3, whatever the size of the pulleys 8 and 9 may be, it is desirable that the peripheral surfaces of all the respective pulleys run at the same rate of speed.

A further advantage of applicant's invention resides in the fact that in the event of the belt slipping on the main pulley such action will immediately be rectified by the tightening of the belt against the main pulley. If the belt slips over the main pulley then the motion of the slipping belt will cause the auxiliary pulleys to rotate faster than the main pulley thereby causing them to turn around the main pulley and change the angles of flexure in the belt and so tighten it against the main pulley and prevent further slipping. In other words, by reason of the geared connection between the pulleys, if the belt slips the auxiliary pulleys will be rotatably moved by the slipping belt around the main pulley to a position where by reason of the change in the angles of flexure the belt will be made to draw hard against the main pulley by the taking up of the belt.

Having thus fully described my invention, I claim and desire to secure by Letters Patent of the United States:—

1. The combination with a pair of pulleys and a belt connecting said pulleys, of means automatically controlled by the differences in tension in the respective portions of the belt for taking up variable slack therein, said means comprising a pair of auxiliary pulleys normally forming angles of flexure in said respective portions, and movable means connecting said auxiliary pulleys whereby they are moved in unison in a direction transverse to the line of centers of said first-named pulleys by said differences in tension, thereby varying said angles of flexure.

2. The combination with a pair of pulleys and a belt connecting said pulleys, of means automatically controlled by the differences in tension in the respective portions of said belt for taking up variable slack therein, said means comprising a pair of auxiliary pulleys normally forming angles of flexure in said respective portions, and means connecting said auxiliary pulleys and movable about a center in the axis of rotation of one of said first-named pulleys whereby said auxiliary pulleys are moved in unison in a direction transverse to the line of centers of said first-named pulleys by said differences in tension, thereby varying said angles of flexure.

3. The combination with a pair of pulleys and a belt connecting said pulleys, of means automatically controlled by the differences in tension in the respective portions of said belt for taking up variable slack therein, said means comprising a pair of auxiliary pulleys movable about a common center and normally arranged to engage said belt and form angles of flexure in said respective portions thereof at points substantially the same distance removed from said center, and means pivotally arranged to be movable about said center and connecting and carrying said auxiliary pulleys whereby said auxiliary pulleys are movable in unison in a direction around said center by said differences in tension, thereby varying said angles of flexure.

4. The combination with a pair of pulleys and a belt connecting said pulleys, of means automatically controlled by the differences in tension in the respective portions of said belt for taking up variable slack therein, said means comprising a pair of auxiliary pulleys and movable means connecting and carrying said auxiliary pulleys whereby they are moved in unison in a direction transverse to the line of centers of said first-named pulleys by said differences in tension to normally form unequal angles of flexure in said portions of the belt.

5. The combination with a pulley and a belt running about said pulley, of a shaft to which said pulley is affixed, a frame pivotally supported from said shaft, said frame comprising sides spaced from one another and each pivotally connecting with said shaft on either side of said pulley, hubs extending from the interior of said sides and meeting in abutting edges for defining the separated position of said sides, means for securing said sides to one another, and auxiliary pulleys carried by said frame to coöperate with said belt.

6. The combination with a pair of pulleys and a belt, connecting said pulleys, of means automatically controlled by the differences in tension in the respective portions of said belt for taking up variable slack therein, said means comprising a set of auxiliary pulleys normally forming angles of flexure in said respective portions, movable means connecting said auxiliary pulleys whereby they are moved in unison in a direction transverse to the line of centers of said first-named pulleys by said differences in tension, thereby varying said angles of flexure, the one angle becoming more acute as the other becomes more obtuse, and means connecting said auxiliary pulleys with one of said first named pulleys whereby all said pulleys may rotate in unison.

7. The combination with a pair of main pulleys and a belt connecting said pulleys, of a set of auxiliary pulleys, means for holding said auxiliary pulleys in contact with said belt, and means connecting said auxiliary pulleys with one of said main pulleys for rotation in unison therewith, whereby the friction bearing of said belt against said main pulley is supplemented by its bearing against said auxiliary pulleys.

8. The combination of a main pulley and a belt, of a set of auxiliary pulleys over which the belt renders as it passes onto and off said main pulley, said auxiliary pulleys being movable to draw said belt around said main pulley in part, means for pivotally supporting said auxiliary pulley from the axis of said main pulley, and means connecting said main and auxiliary pulleys, whereby they may rotate in unison.

9. The combination with a pair of main pulleys and a belt connecting said pulleys, of a set of auxiliary pulleys engaging said belt and adapted to flex the portions thereof in different angular directions, pivoted means for supporting said auxiliary pulleys and permitting bodily movement thereof to change the angles of flexure in said portions of the belt, the one becoming more acute as the other becomes more obtuse, and mechanism connecting said auxiliary pulleys for moving the same around their pivotal support when said belt slips over one of said main pulleys.

10. The combination with a pair of main pulleys and a belt connecting said pulleys, of a set of auxiliary pulleys engaging said belt to flex the portions thereof in different angular directions, pivoted means for supporting said auxiliary pulleys and permitting bodily movement thereof to change the angles of flexure in said portions of the belt, the one becoming more acute as the other becomes more obtuse, and mechanism connecting one of said main pulleys with an auxiliary pulley for moving said auxiliary pulley around said main pulley when said auxiliary pulley is actuated by the slipping of said belt on said main pulley.

11. The combination with a pair of main pulleys and a belt connecting said pulleys, of a set of auxiliary pulleys engaging said belt to flex the portions thereof in different angular directions, means for supporting said auxiliary pulleys pivoted on an axis coincident with the axis of one of said main pulleys and permitting bodily movement of said auxiliary pulleys in a direction around said main pulley to change the angles of flexure in said portions of the belt, the one becoming more acute as the other becomes more obtuse, and geared connections between said main and auxiliary pulleys for moving said auxiliary pulleys around said main pulley when said auxiliary pulleys are actuated by the slipping of the belt on said main pulley.

JAMES H. SEWALL.

In the presence of—
 JOHN E. R. HAYES,
 M. E. FLAHERTY.

Copies of this patent may be obtained for five cents each, by addressing the "Commissioner of Patents, Washington, D. C."